United States Patent
Milanese et al.

(10) Patent No.: US 8,100,366 B2
(45) Date of Patent: Jan. 24, 2012

(54) AUTOMATIC KITE FLIGHT CONTROL SYSTEM

(75) Inventors: Mario Milanese, Turin (IT); Andrea Milanese, Turin (IT); Carlo Novara, Milan (IT)

(73) Assignee: Kite Gen Research S.R.L., Milan (IT)

( * ) Notice: Subject to any disclaimer, the term of this patent is extended or adjusted under 35 U.S.C. 154(b) by 407 days.

(21) Appl. No.: 12/518,577

(22) PCT Filed: Nov. 30, 2007

(86) PCT No.: PCT/IT2007/000834
§ 371 (c)(1),
(2), (4) Date: Jun. 10, 2009

(87) PCT Pub. No.: WO2008/072269
PCT Pub. Date: Jun. 19, 2008

(65) Prior Publication Data
US 2010/0019091 A1    Jan. 28, 2010

(30) Foreign Application Priority Data
Dec. 11, 2006    (IT) .............................. TO2006A0874

(51) Int. Cl.
*A63H 27/04*    (2006.01)
(52) U.S. Cl. .................................. 244/155 A
(58) Field of Classification Search .............. 244/155 A, 244/155 R, 153 R, 115, 33; 290/44, 55; 242/390, 242/390.8, 397.2, 397.3; 254/297, 344
See application file for complete search history.

(56) References Cited

U.S. PATENT DOCUMENTS

| | | | |
|---|---|---|---|
| 5,056,447 A | 10/1991 | Labrador | |
| 5,080,302 A * | 1/1992 | Hoke | .............................. 244/31 |
| 5,435,259 A | 7/1995 | Labrador | |
| 6,003,457 A | 12/1999 | Chatelain | |
| 2004/0035345 A1 | 2/2004 | Lundgren | |
| 2004/0200396 A1 | 10/2004 | Page | |

FOREIGN PATENT DOCUMENTS

| | | |
|---|---|---|
| DE | 3518131 | 11/1986 |
| DE | 102004018814 | 11/2005 |
| EP | 1 672 214 | 6/2006 |
| FR | 2781195 | 1/2000 |
| GB | 2098946 | 12/1982 |

(Continued)

OTHER PUBLICATIONS

International Search Report dated Apr. 22, 2008 for PCT/IT2007/000834.

*Primary Examiner* — Timothy D Collins
*Assistant Examiner* — Nicholas McFall
(74) *Attorney, Agent, or Firm* — Stephen Bongini; Fleit Gibbons Gutman Bongini & Bianco PL

(57) ABSTRACT

A system (10) is described for performing the automatic control of the flight of at least one kite (11) controlled and driven by cables (13) comprising at least one first actuating motor (12) adapted to exert an unwinding-rewinding action of such cables (13) on respective winches (14a, 14b) and at least one second actuating motor (15) adapted to perform a differential control action of such cables (13).

8 Claims, 2 Drawing Sheets

FOREIGN PATENT DOCUMENTS

| | | |
|---|---|---|
| GB | 2098951 | 12/1982 |
| IT | TO2003A000945 | 11/2003 |
| IT | TO2006A000372 | 5/2006 |
| WO | 03/097448 | 11/2003 |
| WO | 2005/100149 | 10/2005 |
| WO | 2005/101148 | 10/2005 |
| WO | WO2005100147 | 10/2005 |
| WO | WO2007122650 | 11/2007 |

* cited by examiner

AUTOMATIC KITE FLIGHT CONTROL SYSTEM

The present invention refers to a device for performing commands of a suitable automatic control system of the flight of power wing profiles (generically designated herein below by the term "kites"), particularly for optimising the conversion of wind energy into electric or mechanical energy through the flight of kites connected through cables to ground converting devices.

From some prior patents, in fact, processes are known for converting wind energy into electric or mechanical energy through devices that are able to convert the mechanical energy generated by the wind source into another form of energy, typically electric energy, that subtract the wind energy from the wind by using kites connected thereto through cables. In particular, Italian Patent Application n. TO2003A000945, European Patent Application n. 04028646.0 and Italian Patent Application n. TO2006A000372 disclose systems for converting the kinetic energy of wind currents into electric energy by controlling the flight of kites connected to a system of the "carousel" type or through traction and recovery steps. In the past, several arrangements have also been proposed related to dragging boats by means of devices that capture the wind currents through kites, like those described in particular in British Patent n. 2,098,951, U.S. Pat. Nos. 5,056,447, 5,435,259, International Patent Application n. WO03097448, U.S. Patent Application n. U.S. 2004035345, U.S. Patent Application n. U.S. 2004200396, International Patent Application n. WO2005100147, International Patent Application n. WO2005100148, International Patent Application n. WO02005100149, and German Patent Application n. DE102004018814.

Figure 1:
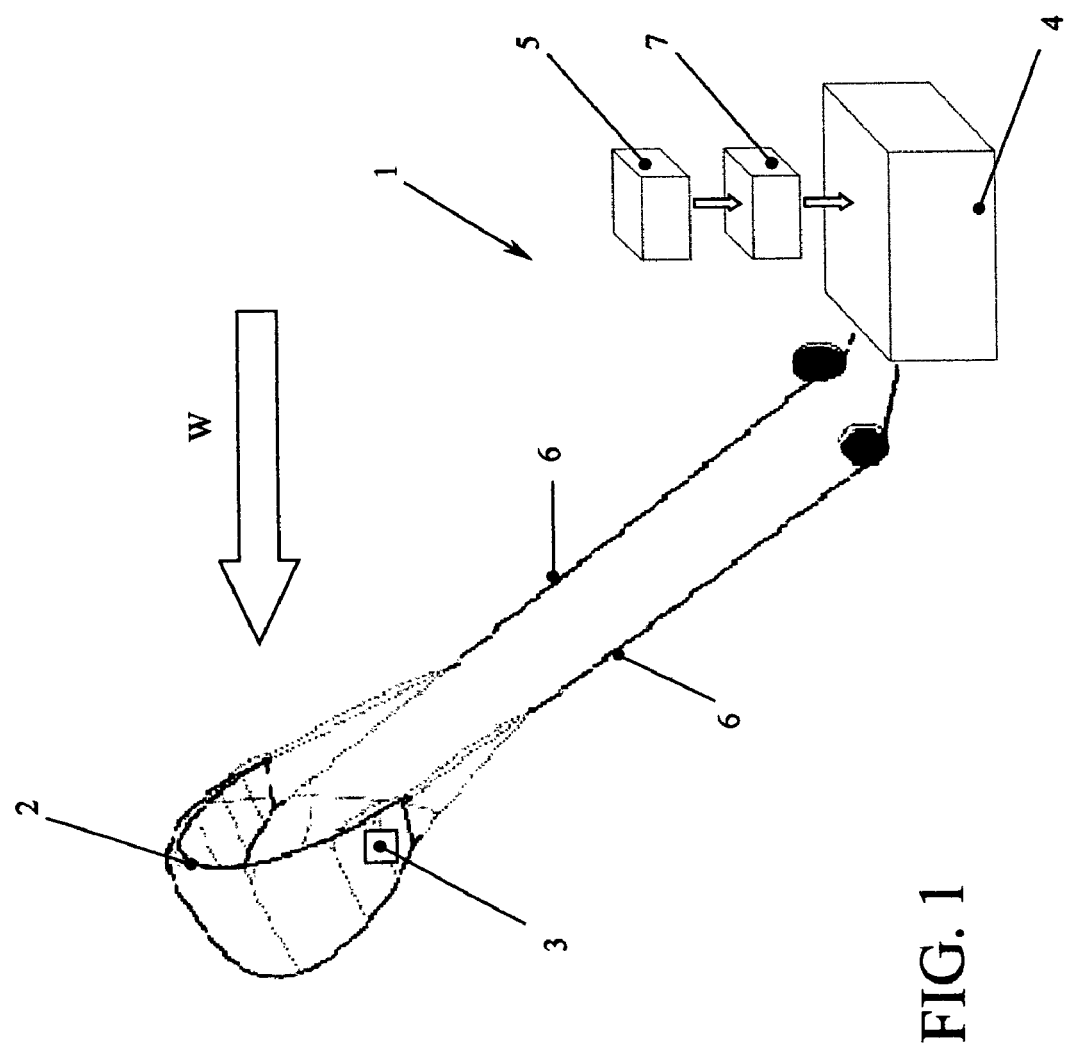

In the above systems, the control of the flight of kites is obtained through systems like the one shown in the enclosed FIG. 1, in which the control system 1 generally comprises:
- detecting means 3 on board the kite 2, adapted to detect first pieces of information dealing at least with position and orientation in space of the kite 2 itself and three-axes accelerations to which it is subjected;
- detecting means 5 on the ground adapted to detect second pieces of information dealing at least with the amount of tension on driving cables of the kite 2 and their relative position, direction and intensity of a wind current W inside which the kite 2 is immersed;
- processing and controlling means 7 of the first and second pieces of information, adapted to transform the contents of such information into a suitable control action that is performed in a mechanical drive operating on the driving cables 6 of the kite 2 through an actuating unit 4; the actions that such unit 4 must perform on the cables 6 are substantially of two types: parallel unwinding or rewinding of the two cables 6 and differential control of the position of the cables 6.

An operating mode already proposed by the prior art is making the two above action performed by two winches for winding the cables 6, driven by two independent motors. In this way, however, the high inertias of winches can excessively reduce the ready actuation of the differential control, limiting the efficiency of controlling the flight of kites. Moreover, with this arrangement, it is not possible to advantageously take into account that the powers involved in the parallel unwinding-rewinding of the two cables are high and the required accuracies for controlling the unwinding-rewinding movement are small, while instead for the differential control of the cables, powers are small and required accuracy is high. In the above arrangement, the two motors must have both the high necessary powers for the parallel unwinding-rewinding of the two cables, and the required accuracy for the differential control, thereby requiring the use of two costly motors.

Therefore, object of the present invention is solving the above prior art problems by providing a system in which at least two mutually independent motors are used, respectively one for performing the action of unwinding-rewinding the cables and the other one for performing the differential control action.

The above and other objects and advantages of the invention, as will appear from the following description, are obtained by a system for performing the automatic control of the flight of kites as described in claim 1. Preferred embodiments and non-trivial variations of the present invention are the subject matter of the dependent claims.

Figure 2:
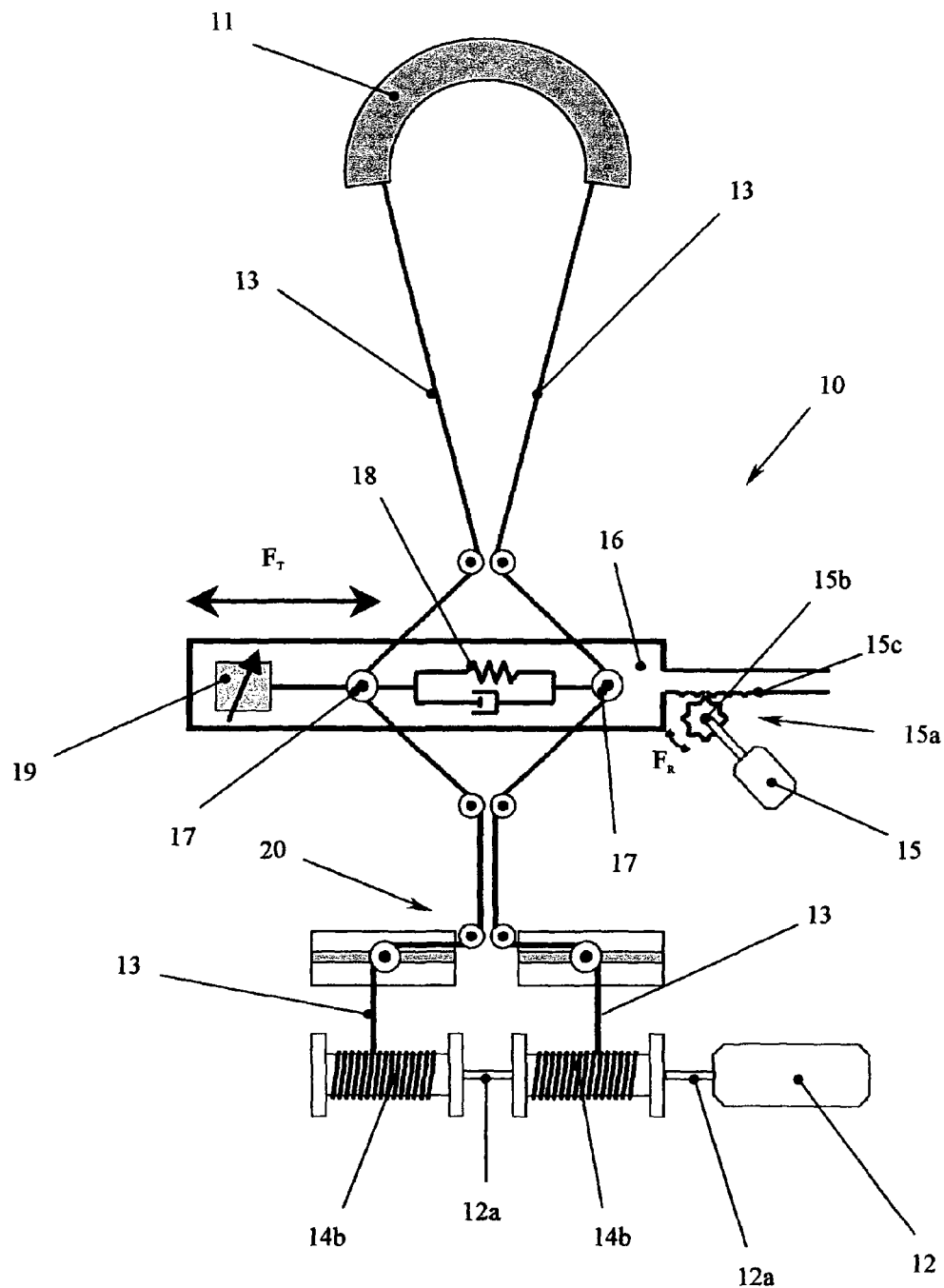

The present invention will be better described by some preferred embodiments thereof, provided as a non-limiting example, with reference to the enclosed drawings, in which:

FIG. 1 shows a schematic representation of an embodiment of a control of the flight of kites according to the prior art; and FIG. 2 shows a schematic representation of an embodiment of the system for performing the automatic control of the flight of kites according to the present invention.

With reference then to FIG. 2, it is possible to note that the system 10 for performing the automatic control of the flight of at least one kite 11 according to the present invention comprises:
- at least one first actuating motor 12 adapted to control the rotation of at least two winches 14a, 14b on each one of which at least one of at least two cables 13 for controlling and driving the kite 11 is wound, in order to exert a unwinding-rewinding action of said cables 13 on said winches 14a, 14b; possibly, each cable 13 can be driven in a length thereof included between kite 11 and respective winch 14a, 14b by a suitable system of transmissions 20; in order to exert an unwinding-rewinding action of cables that is synchronous and equal, in a preferred embodiment, the winches 4a, 4b have a drum with the same diameter and are both keyed-in onto the same drive shaft 12a of the first actuating motor 12;
- at least one second actuating motor 15 adapted to control a translation movement (for example, along the direction shown by arrow $F_T$) of at least one slide 16, such slide being equipped with at least two blocks 17 for the diverging transmission of the cables 13 in order to perform a differential control action of the two cables 13. In particular, in order to perform the above translation movement, the second actuating motor 15 can cooperate with the slide 16 through at least one rack-type mechanism 15a, made of at least one driving toothed wheel 15b actuated by the second actuating motor 15 meshing on at least one rack 15c integral with the slide 16, the direction of the translation movement $F_T$ of the slide 16 obviously depending on the rotation direction (designated as an example by arrow $F_R$) of the toothed wheel 15b.

Possibly the system 10 according to the present invention could also comprise:
- at least one dampening system 18 to absorb the variations of the traction forces of the kite 11 on the cables 13, possibly induced by wind turbulences,
- at least one load sensor 19, made for example as a load cell, adapted to allow evaluating the instantaneous values of the traction forces, values that can be used by a control system of the flight of the kite both for optimising the generated powers, and for performing interventions to minimise the risks of structural overloads in case of high wind turbulences.

It can be noted that, in the system 10 for performing the control of the flight of kites of present invention, the powers required by the first actuating motor 15 are very low, since the traction forces exerted on the slide 16 by the two cables 13 through the blocks 17 are mostly cancelled. Moreover, inertias involved in the movement of the slide 16 are very low (with respect to those of the winches 14a, 14b), allowing a high response readiness in controlling the flight of the kite 11.

The invention claimed is:

1. A system for performing an automatic control of a flight of at least one kite, the system comprising:
    at least one kite controlled and driven by cables
    at least one first actuating motor exerting an unwinding-rewinding action of the cables on respective winches; and
    at least one second actuating motor performing a differential control action of the cables,
    wherein the second actuating motor drives a translation movement of at least one slide, the slide being equipped with at least two blocks for a diverging transmission of the cables.

2. The system of claim 1, wherein the first actuating motor drives a rotation of the two winches.

3. The system of claim 1, wherein the winches have a drum with the same diameter and are both keyed-in on a same drive shaft of the first actuating motor.

4. The system of claim 1, wherein each one of the cables is driven in a section thereof, included between the kite and a respective winch, by a system of transmissions.

5. The system of claim 1, wherein the second actuating motor is adapted to cooperate with the slide through at least one mechanism of a type with a rack, comprising at least one driving toothed wheel actuated by the second actuating motor meshing on at least one rack integral with the slide.

6. The system of claim 1, further comprising at least one dampening system adapted to absorb variations of traction forces of the kite on cables.

7. The system of claim 6, further comprising at least one load sensor adapted to allow evaluating instantaneous values of the traction forces.

8. The system of claim 7, wherein the load sensor is a load cell.

* * * * *